United States Patent [19]

Kishi et al.

[11] Patent Number: 5,635,925

[45] Date of Patent: Jun. 3, 1997

[54] VOLUME CONTROL OF AURAL GUIDANCE OF VEHICLE ROUTE GUIDANCE APPARATUS

[75] Inventors: Hiroshi Kishi, Toyota; Toru Ito, Nagoya; Shoji Yokoyama, Anjo; Kyomi Morimoto, Nisho; Mitsuhiro Nimura, Okazaki; Shigekazu Ohara, Chiryu, all of Japan

[73] Assignees: Toyota Jidosha K.K., Toyota; Aisin AW Co., Ltd., Anjo, both of Japan

[21] Appl. No.: 598,959

[22] Filed: Feb. 9, 1996

Related U.S. Application Data

[63] Continuation of Ser. No. 95,439, Jul. 23, 1993, Pat. No. 5,506,578.

[30] Foreign Application Priority Data

| Jul. 23, 1992 | [JP] | Japan | 4-195778 |
| Jul. 23, 1992 | [JP] | Japan | 4-195780 |
| Jul. 23, 1992 | [JP] | Japan | 4-195781 |
| Aug. 19, 1992 | [JP] | Japan | 4-220009 |

[51] Int. Cl.⁶ ............................................. G08G 1/123
[52] U.S. Cl. .................... 340/996; 340/995; 340/460; 340/902; 340/692; 364/449.1; 381/86; 455/221
[58] Field of Search .................... 340/996, 940, 340/995, 692, 460, 902, 870.28; 364/449; 381/85, 86, 123, 10, 110; 455/194.1, 200.1, 186.1, 212, 218, 219, 220, 221, 222, 225

[56] References Cited

U.S. PATENT DOCUMENTS

| 3,518,375 | 6/1970 | Hawkins | 381/80 |
| 3,723,876 | 3/1973 | Seaborn, Jr. | 455/18 |
| 3,806,820 | 4/1974 | Uchiyama | 455/219 |
| 3,876,940 | 4/1975 | Wickord et al. | 455/341 |
| 3,887,872 | 6/1975 | Sharpe | 455/218 |
| 3,921,074 | 11/1975 | Baird | 455/221 |
| 4,164,625 | 8/1979 | Igeta | 381/86 |
| 4,347,510 | 8/1982 | Ishigaki et al. | 381/85 |
| 4,352,089 | 9/1982 | Yano | 340/52 |
| 4,359,714 | 11/1982 | Tsunoda et al. | 340/460 |
| 4,389,639 | 6/1983 | Torii | 340/539 |
| 4,401,848 | 8/1983 | Tsunoda | 381/86 |
| 4,403,208 | 9/1983 | Hodgson et al. | 340/902 |

(List continued on next page.)

FOREIGN PATENT DOCUMENTS

| 0 330 062 | 8/1989 | European Pat. Off. |
| 1-173815 | 7/1989 | Japan |
| 1-173818 | 7/1989 | Japan |
| 2-2483 | 1/1990 | Japan |
| 2-103584 | 4/1990 | Japan |
| 3-137677 | 6/1991 | Japan |
| 3-269317 | 11/1991 | Japan |

OTHER PUBLICATIONS

Davis et al., The Back Seat Driver: Real Time Spoken Driving Instructions, *Vehicle Navigation & Information Systems Conference Publications*, Sep. 11–Sep. 13, 1989, pp. 146–150.

Electro Multivision, *CELSIOR*, Aug. 20, 1992, pp. 105–109.

*Primary Examiner*—Jeffery Hofsass
*Assistant Examiner*—Benjamin C. Lee
*Attorney, Agent, or Firm*—Cushman, Darby & Cushman IP Group of Pillsbury Madison & Sutro LLP

[57] ABSTRACT

An apparatus to facilitate volume control for route aural guidance. When supplying a guidance voice to a loudspeaker 34a, a voice control section 30 disconnects the loudspeaker 34a from audio and outputs the guidance voice through the loudspeaker. A volume control screen is displayed on a display section 28 where the user adjusts the volume by touching the screen. When the voice control section 30 switches a signal to the loudspeaker 34a, a mute circuit 40a is operated to mute the voice output before the voice is output through the loudspeaker 34a. When the user terminates volume adjustment, the voice control section 30 outputs a voice for volume confirmation or check at the adjusted volume through the loudspeaker 34a. The user can check the adjusted volume at this time.

9 Claims, 13 Drawing Sheets

U.S. PATENT DOCUMENTS

| | | | |
|---|---|---|---|
| 4,450,589 | 5/1984 | Eilers et al. | 455/205 |
| 4,476,573 | 10/1984 | Duckeck | 455/45 |
| 4,499,603 | 2/1985 | Eilers | 455/205 |
| 4,525,867 | 7/1985 | Shiratani | 455/194.1 |
| 4,675,905 | 6/1987 | Flora | 381/81 |
| 4,691,361 | 9/1987 | Yoshino et al. | 381/81 |
| 4,754,486 | 6/1988 | Stafford et al. | 381/86 |
| 4,829,592 | 5/1989 | Wieschhoff et al. | 455/194.1 |
| 4,971,583 | 11/1990 | Umehara | 440/2 |
| 4,979,231 | 12/1990 | Johnson et al. | 455/58 |
| 5,043,902 | 8/1991 | Yokoyama | 364/449 |
| 5,243,640 | 9/1993 | Hadley et al. | 379/59 |
| 5,243,659 | 9/1993 | Stafford et al. | 381/86 |
| 5,263,199 | 11/1993 | Barnes et al. | 455/344 |
| 5,321,671 | 6/1994 | Yoshida | 369/6 |

VOLUME CONTROL OF AURAL GUIDANCE OF VEHICLE ROUTE GUIDANCE APPARATUS

This is a continuation of our application Ser. No. 08/095,439 filed Jul. 23, 1993, now U.S. Pat. No. 5,506,578.

BACKGROUND OF THE INVENTION

1. Field of the Invention

This invention relates to a vehicle route guidance apparatus for aurally guiding the user through a route in a voice and more particularly to volume control therefor.

2. Description of the Related Art

Various types of apparatus to relieve drivers of their work load have been designed and are carried by vehicles; one of them is a route guidance apparatus for guiding the user through a route to a destination. A route guidance apparatus which has a function of informing the driver of routing, when the vehicle passes a branch point such as a crossing, for guiding the driver through the route using a generated voice is known.

On the other hand, usually the vehicle is equipped with audiovisual machines such as a radio, television, and cassette tape recorder and is provided with voice output means such as a loudspeaker unit. Thus, it may be preferable that a voice for route guidance is also output from the audio loudspeaker unit. The aural route guidance is disclosed, for example, in Japanese Patent Laid-Open No.Hei 1-173815.

However, an output from audiovisual machines differs entirely from a voice for guiding the driver through a route in nature or purpose. The purpose of the voice guidance is only for the driver to listen to what the guidance says; the audiovisual machines also output music and are often not intended for the user to clearly listen to what the output says. Therefore, it is not preferable that the volume of the guidance voice is set to the same as that of the audiovisual machine output. Ease of listening to the guidance voice varies depending on the in-vehicle environment such as the amount of vehicle running noise and audiovisual machine output; the preferred volume for the guidance voice also varies from one person to another.

SUMMARY OF THE INVENTION

Accordingly, it is an object of the invention to effectively adjust the volume of a guidance voice.

It is another object of the invention to enable the user to check the volume adjusted by using volume control means for effective control of the volume of a guidance voice.

To these ends, according to one embodiment of the invention, there is provided a vehicle route guidance apparatus which outputs route guidance aurally through a loudspeaker of an audiovisual apparatus such as a radio, comprising:

a section which generates a guidance voice signal for route guidance;

means for amplifying the guidance voice signal from the guidance voice generation section to a predetermined signal level and outputting the amplified signal;

volume setting means being responsive to external operation for setting the output signal level from the amplification means;

a circuit change switch for selecting an output from the audiovisual apparatus or an output from the amplification means for supplying to the loudspeaker; and a control section which switches the switch at the guidance voice output timing for outputting a guidance voice through the loudspeaker, wherein the volume of the guidance voice output through the loudspeaker can be adjusted independently of the volume of an output from the audiovisual apparatus.

Thus, in the invention, the loudspeaker is used for both the audiovisual apparatus and the route guidance apparatus, but the volume of a guidance voice is adjusted independently of that of an output from the audiovisual apparatus. Therefore, route guidance can be executed with a voice at a user's preferred volume.

Preferably, the audiovisual apparatus has volume control means and the control section controls the volume control means to mute an output signal from the audiovisual apparatus before switching the switch. After the audiovisual apparatus output is muted, a change is made to an output of a guidance voice, thereby preventing any "popping" noise from occurring at the time of changeover.

Preferably, the route guidance apparatus further includes a display section which displays various pieces of information and is formed with a touch panel on a surface thereof wherein the volume setting means is volume control indicators displayed on the display section and volume is set by touching the indicators. This eliminates the need for providing any special keys, for effective use of space.

Preferably, the volume setting indicators are made up of two keys for increasing and decreasing volume.

Preferably, the volume setting indicators further include indicators indicating the current volume level to enable the user to easily set the volume.

Preferably, the route guidance apparatus further includes:

volume control means being responsive to external operation for adjusting guidance voice volume;

means for determining whether or not the volume control means is operated; and when operating the volume control means is detected by the operation determination means, means for outputting a predetermined voice at the adjusted volume, whereby the volume adjusted after the volume control means is operated can be checked. Thus, in the invention, volume adjustment is detected by the determination means and a voice is output at the adjusted volume. Then, the user can immediately check the adjusted volume for effective volume control of the guidance voice.

Preferably, the voice output means outputs the predetermined voice when the volume control means is not operated over a predetermined period after the operation determination means determines that the volume control means has been once operated. This facilitates volume control and eliminates the need for special operation to terminate the volume adjustment.

DESCRIPTION OF THE PREFERRED EMBODIMENTS

Referring now to the accompanying drawings, there are shown preferred embodiments of the invention.

Figure 1:
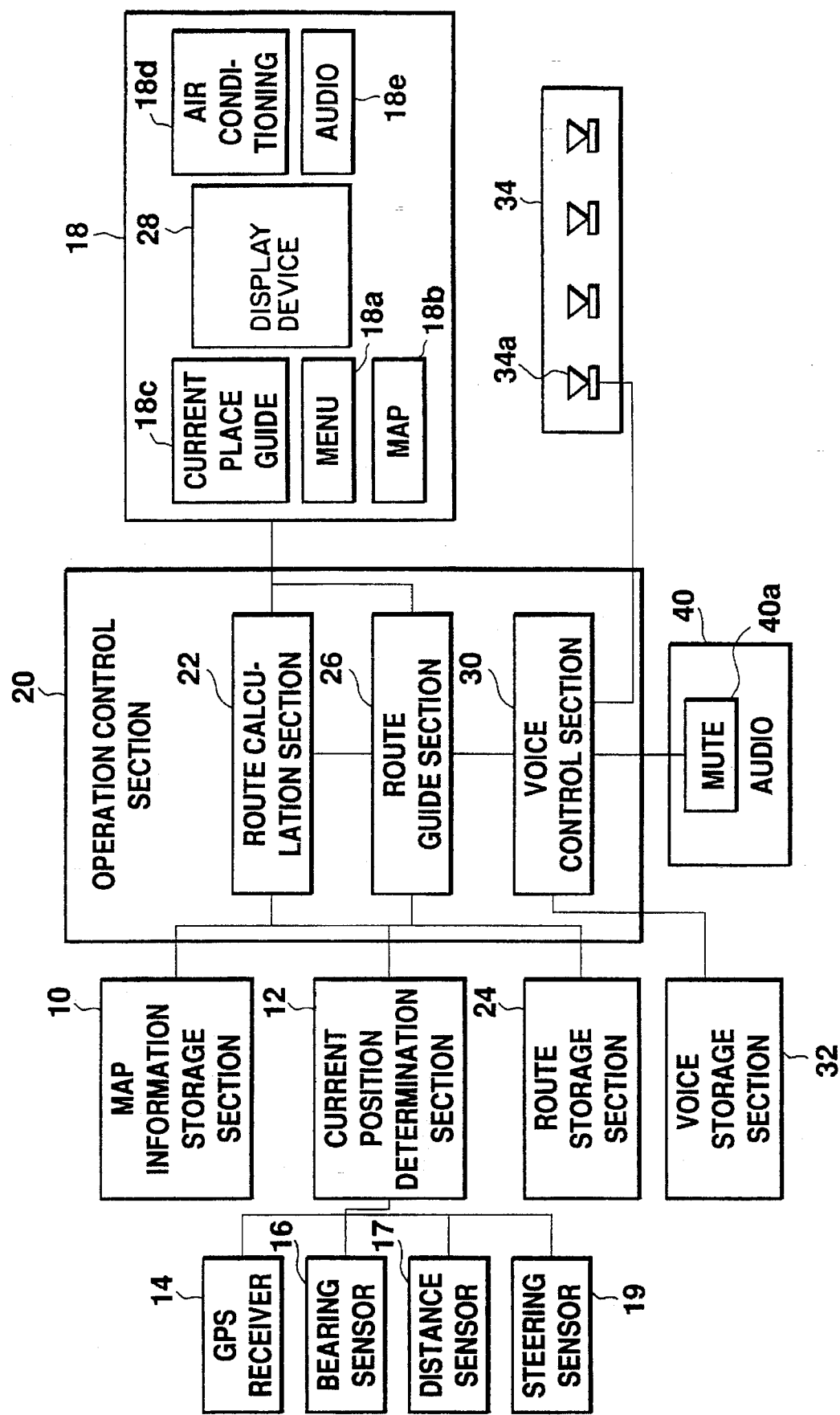
FIG. 1 is a block diagram showing the overall configuration of a route guidance apparatus according to one embodiment of the invention.

FIG. 1 shows a block diagram showing the configuration of a route guidance apparatus according to one embodiment of the invention. Numeral 10 is a map information storage section which stores information such as road names, place names (crossing names), building names, and river names; the stored map information can be read as required. Numeral 14 is a GPS receiver using the Global Positioning System (GPS), a satellite navigation system for determining the current position of the vehicle carrying the apparatus. Numeral 16 is a bearing sensor 16 which detects the direction of movement of the vehicle in response to terrestrial magnetism. Numeral 17 is a distance sensor which detects the traveling distance in response to the number of wheel revolutions. Numeral 12 is a current position determination section which determines the current position of the vehicle in response to the detection results of the sensors 16 and 17. Information from a steering sensor 19 is also entered; it is used for map matching for correcting the current place to the crossing position on the map when the driver turns the vehicle to the right or left at a crossing.

For the route guidance apparatus to guide the driver through a route to a destination, the user should specify the destination on a display section screen (described below) through an input section 18 or enter information such as a place name. A route to the destination from the current position calculated by the current position determination section 12 is calculated by a route calculation section 22 contained in an operation control section 20, and the calculated route is stored in a route storage section 24. An appropriate route search method is adopted for calculating the route.

After the destination is entered and the route is determined, actual route guidance is executed. A route guidance section 26 contained in the operation control section 20 reads map information around the vehicle from the map information storage section 10, and displays it together with the current vehicle position and of, direction movement and the route stored in the route storage section 24 on the display section 28.

Figure 2:
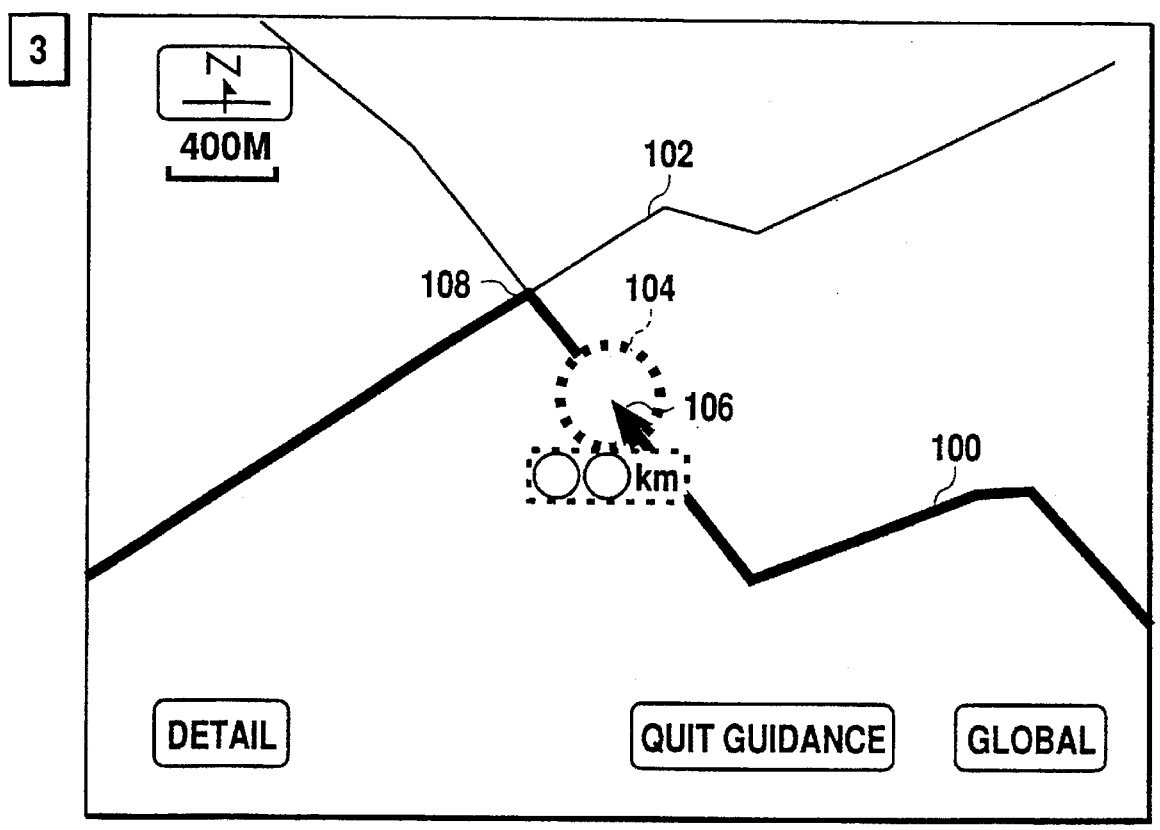
FIG. 2 is an illustration showing a display example of route guidance.

The display section 28 is located in an instrument panel near the driver's seat. Seeing the display section 28, the driver checks the position of the vehicle and gets information on the forward route. FIG. 2 shows an example of display on the display section 28. In FIG. 2, the selected route is indicated by a thick solid line 100 and other roads are indicated by thin solid lines 102. The position of the vehicle is indicated by a circle 104 and the direction of movement is indicated by a wedge-shaped arrow 106. Displayed roads can be distinguished from each other in colors as well as by line thickness.

Figure 3:
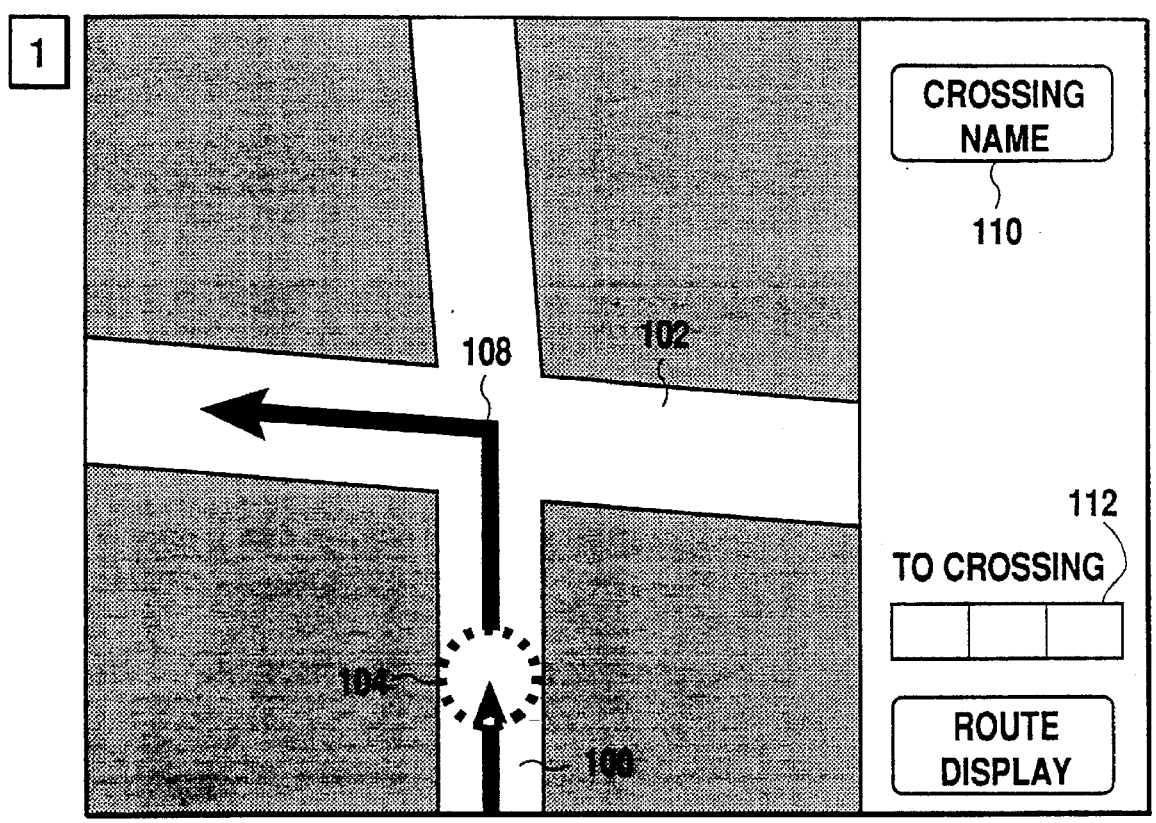
FIG. 3 is an illustration showing a display example of route guidance around a crossing.

When the position of the vehicle approaches a crossing 108 where the course is to be changed, the display screen changes to that as shown in FIG. 3, and crossing name 110 and distance 112 to the crossing are displayed. At the same time as the display change, the route guidance section 26 instructs a voice control section 30 to generate a voice corresponding to route guidance at the crossing. The voice control section 30 reads information stored in a voice storage section 32 as digital data and converts it into analog signals for driving a loudspeaker section 34. The voice control section 32 tells the driver a message such as "at the *** crossing about 300 m ahead turn to the left" through the loudspeaker section 34 for route guidance. The voice instruction is given every predetermined distance until the vehicle passes through the crossing. For example, when the vehicle travels on a road of two or more lanes, the first guidance is given 700 m short of the crossing, the second 300 m short of the crossing, and the final guidance 100 m short of the crossing. The guidance voice is stored in a voice storage section 32 as digital data for each phrase. To output a guidance voice, a number of digital data pieces are read for phrase synthesis. Then, the guidance voice is output from the loudspeaker section 34 as guidance signals. The guidance voice output timing is detected by the route guidance section 26 and processing for the voice output is performed by the voice control section 30.

In the embodiment, the display section 28 uses a touch panel as its screen which also functions as the input section. The touch panel enables the driver to enter data simply by touching entries such as a place name displayed on the display section 28. The input section 18 is provided with a menu key 18a to return to a MENU screen for selecting processing such as destination input or volume control, a map key 18b for displaying a map, a current place guidance key 18c to return to a current place display screen or request guidance in the current state, an air conditioning key 18d for displaying an air conditioner control screen, and an audio key 18e for displaying an audio control screen.

In the embodiment, the audiovisual loudspeaker section 34 is used to output voice guidance. One of four audiovisual loudspeakers 34 (the front right loudspeaker 34a disposed on the side of the driver's seat) is used for a guidance voice. Thus, an output from audio 40 is directly connected to the three loudspeakers of the loudspeaker section 34, while the right front loudspeaker 34a is connected via the voice control section 30 to the audio 40. When no guidance voice is output, the voice control section 30 supplies an output from the audio 40 to the loudspeaker 34a as it is; when a guidance voice is output, the voice control section 30 supplies guidance voice signals rather than the output from the audio 40 to the loudspeaker 34a. Thus, the audio output through the loudspeaker 34a stops and a guidance voice is output through the loudspeaker 34a. The three loudspeakers other than the loudspeaker 34a of the loudspeaker section 34 are not affected by the guidance voice output.

Figure 4:
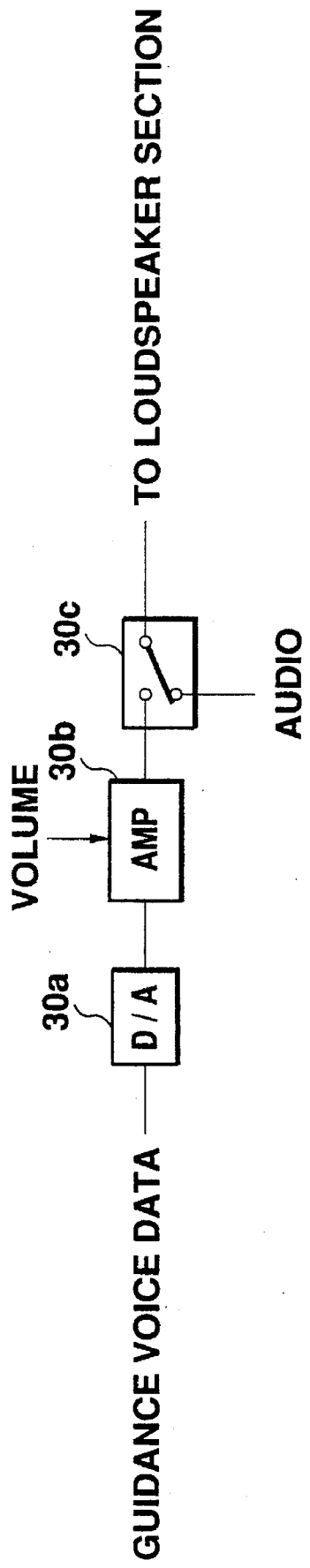
FIG. 4 is a block diagram showing the configuration for a voice control section to output a voice.

FIG. 4 shows the configuration for the voice control section 30 to output voice signals. As shown here, digital voice data read from the voice storage section 32 is temporarily stored in a RAM (not shown) or the like and is subjected to phrase synthesis, etc., then the result is supplied as serial data to a D/A converter 30a which then converts it into an analog voice signal. This analog voice signal is amplified by an amplifier 30b to the predetermined amplitude specified by a volume signal, and the amplified signal is fed into a switch 30c. That is, the amplifier 30b amplifies the signal at a given factor and the attenuation factor to the output signal is determined by the volume signal; as a result, the output signal at the level conforming to the volume signal can be obtained.

The switch 30c is provided to select either an audio signal or a guidance voice from the amplifier 30b for supply to the loudspeaker 34a. At the normal time, the audio signal is supplied to the loudspeaker 34a, and only when a guidance voice is output, the signal from the amplifier 30b is selected under the control of the voice control section 30 in response to a signal from the route guidance section 26.

Figure 5A:
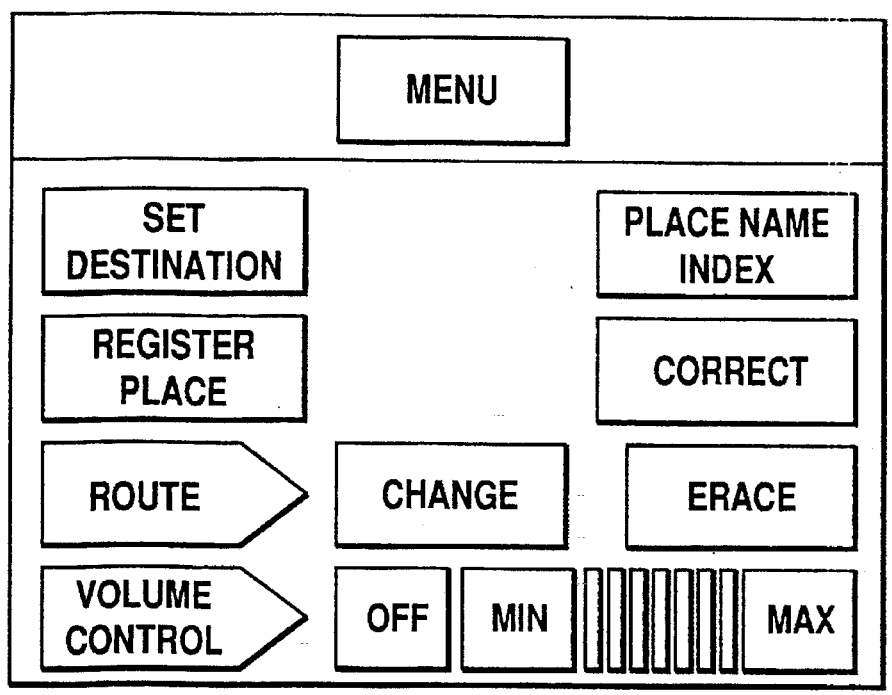
FIGS. 5A and 5B are illustrations of a display.

The size of the output signal at the amplifier 30b is determined by a volume signal input thereto. The volume signal in turn is determined by touching a volume control indicator displayed on the display section 28. The MENU screen of the display section 28, as shown in FIG. 5A, contains volume control indicators on the bottom of the screen. The attenuation factor becomes 128 dB by touching the OFF indicator and an output of a guidance voice is stopped. The attenuation factor at the amplifier 30b is increased by a predetermined value by touching the MIN indicator and decreased by a predetermined value by touching the MAX indicator. After the OFF indicator is touched, the guidance voice is not output. When the MIN indicator or MAX indicator is touched, the guidance voice is restarted. The volume of the guidance voice is the same as the volume when the OFF indicator was touched.

Seven levels of volume are displayed between the MIN and MAX indicators, and the volume corresponding to the displayed level can be set. If the indicator MIN or MAX is touched, a volume signal supplied to the amplifier 30b can be changed so that the attenuation factor becomes 2, 8, 14, 18, 22, 28, or 30 dB for controlling the volume.

In the embodiment, the loudspeaker 34a is used for both voice guidance and audiovisual machine outputs, but volume control is performed completely separately. The driver can adjust the volume on the MENU screen for setting the guidance voice volume as he or she desires.

Further, in the embodiment, a mute circuit 40a is located at the output stage of the audio 40. Before outputting a guidance voice, namely, switching the switch 30c, the voice control section 30 sends a signal to the mute circuit 30c for operating the circuit so as to attenuate a signal supplied to the loudspeaker 34a. This can prevent a popping noise from occurring when the switch 30c is switched. When the guide voice output terminates, the voice control section 30 switches the switch 30a to the audio position and releases the mute by the mute circuit 40a, thereby restoring audio output at the front right loudspeaker 34a.

If the menu key 18a is pressed, the MENU screen can always be displayed for volume control at any desired time.

Figure 6:
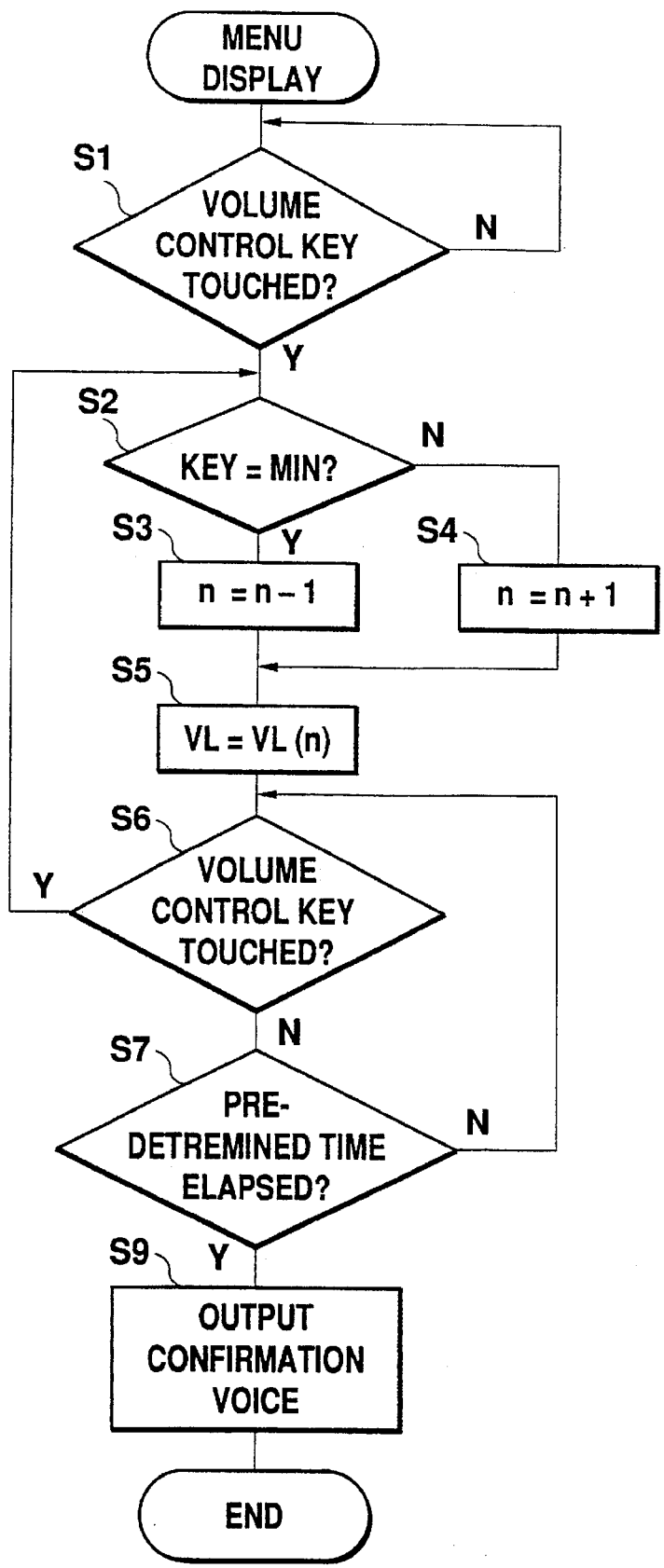
FIG. 6 is a flowchart showing the volume control operation sequence.

The volume control operation is described in conjunction with FIG. 6. First, whether or not the volume control key (MIN or MAX) is touched on the MENU screen is determined at step S1. If any key other than the volume keys is touched, its corresponding operation is performed. If the volume key is touched, whether or not the key is the MIN key for decreasing volume is determined at step S2. If the key is MIN, variable n for determining the volume is decremented by one at step S3. On the other hand, if the key is not MIN, namely, it is MAX, the variable n is incremented by one at step S4. A volume signal is set to a value VL (n) corresponding to the variable n at step S5. That is, the volume signal corresponding to the attenuation factor 2, 6, 14, 18, 22, 26, or 30 dB is preset to VL (n) where n=1–7, and as the MIN or MAX key is touched, the volume signal is changed to a contiguous one. The variable n should range from 1 to 7. The variable n is initialized to the center value VL (4); once the variable n is set, the value should be stored.

Next, whether or not the volume control key is touched is determined at step S6. If the key is touched, control returns to step S2. Touching the volume key is detected and entered every predetermined time period, such as 0.3 seconds, thereby changing VL in sequence in response to continuous touching of the volume key. Accordingly, the volume indicators also change. On the other hand, if the volume key is not touched at step S6, whether or not a predetermined time, such as one second, has elapsed is determined at step S7. If the time has not yet elapsed, control returns to step S6 at which whether or not the volume control key is touched is determined.

If the volume key is not touched and the predetermined time has elapsed, a confirmation voice is output at step S8. A voice message such as "guidance will be issued at this volume" is output in response to the volume level VL set as described above. Therefore, the user can use the voice to check the volume. The output of the amplifier 30c in FIG. 4 is controlled in response to the VL and voice guidance is executed at the setup volume. The voice for volume confirmation or check is also stored in the voice storage section 32 and is output through the loudspeaker section 34 like the guidance voice.

Although whether or not touching of the volume control key terminates is determined by detecting no operation for the predetermined time at step S7 in the embodiment, instead of the determination made according to the time of no operation, a CONFIRM/TERMINATE key that can be touched by the driver at the termination of touching the volume control key can be provided, and when the driver touches the CONFIRM/TERMINATE key, it may be determined that touching the volume control key terminates.

In the embodiment, when the volume is adjusted, a voice for volume confirmation or check is output after the volume control operation terminates. This enables the driver to immediately check the adjusted voice for preferred volume control.

For route guidance, a destination must be entered. The route guidance apparatus has functions such as changing the destination and previously storing predetermined places, and to use these functions, the corresponding operations are required.

Figure 5B:
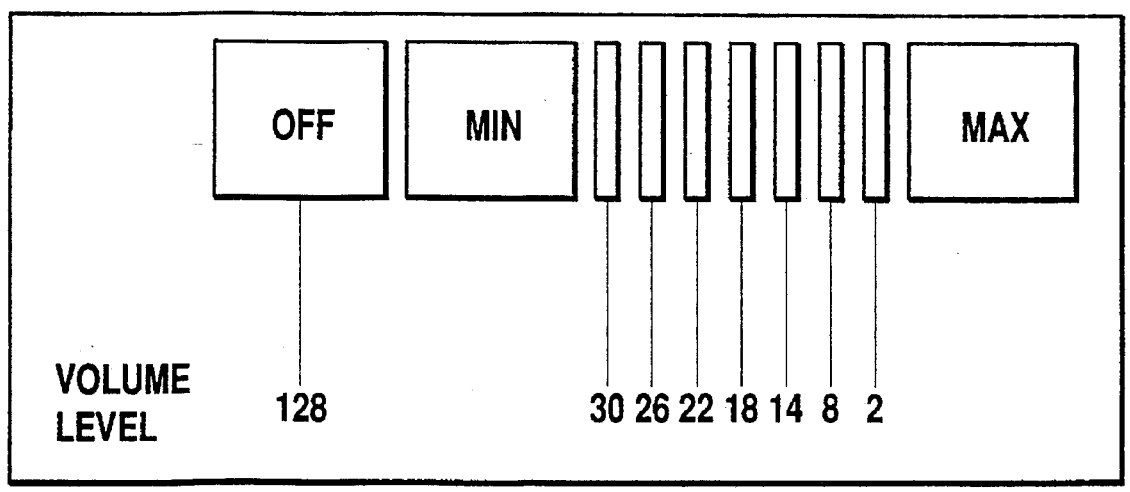

As shown in FIG. 5, indicators such as "SET DESTINATION," "PLACE NAME INDEX," "REGISTER PLACE," "CORRECT," "CHANGE," "ERASE," "OFF," "MIN," and "MAX," are displayed on the MENU screen. The user can touch any indicator for desired processing.

SET DESTINATION

Figure 7:
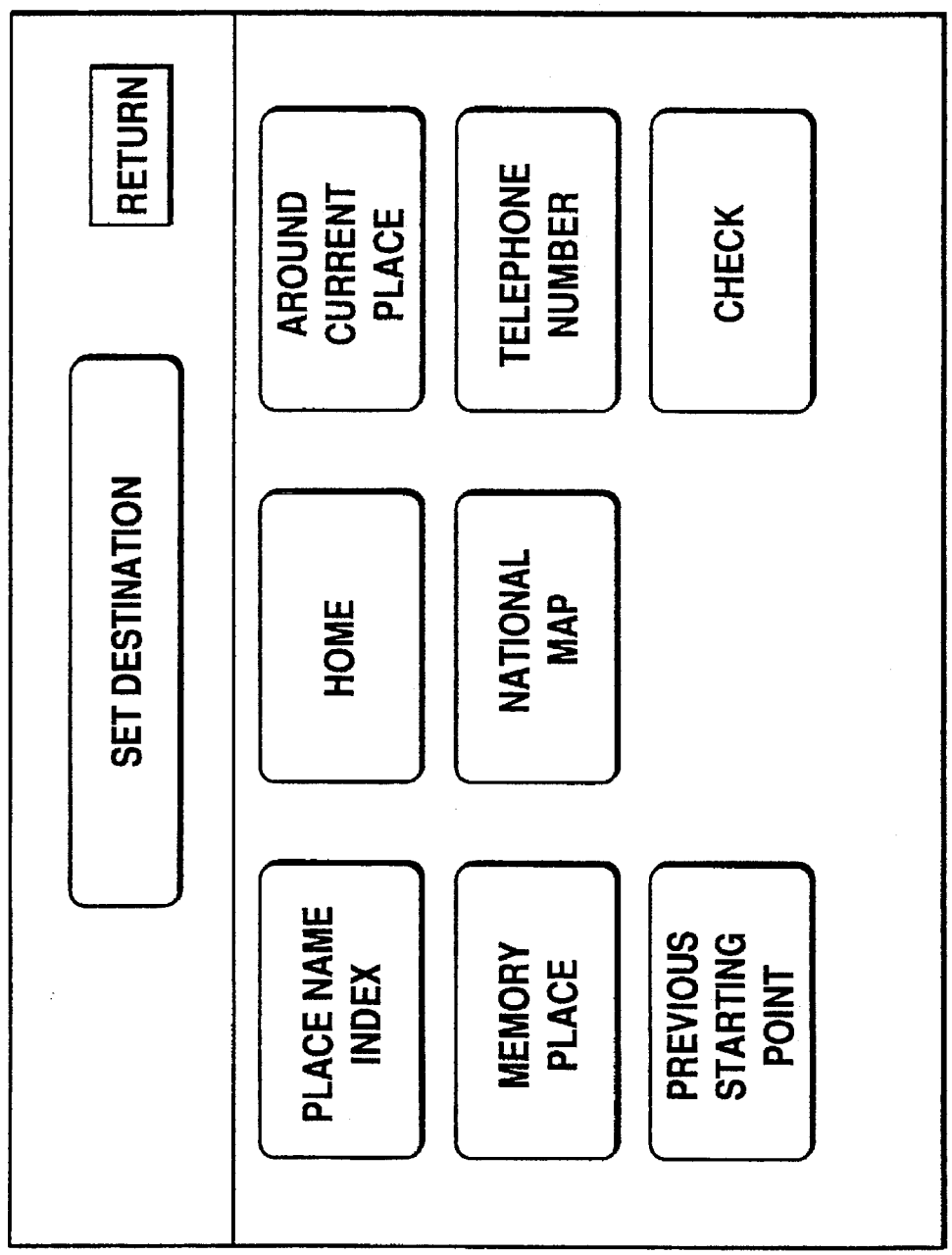
FIG. 7 is an illustration of a display of a SET DESTINATION screen.

When the user touches the SET DESTINATION indicator on the MENU screen, the SET DESTINATION screen shown in FIG. 7 is displayed. As shown here, "PLACE NAME INDEX," "HOME," "AROUND CURRENT PLACE," "MEMORY PLACE," "NATIONAL MAP," "TELEPHONE NUMBER," "PREVIOUS STARTING POINT," "CHECK," and "RETURN" are displayed on the SET DESTINATION screen. If the user touches "PLACE INDEX," the screen shifts to a place index display process. If the user touches "HOME," the home prestored as a destination is set. The home is registered at another step. If the user selects "AROUND CURRENT PLACE," a map around the current place is displayed, enabling the user to set a destination. If the user touches "MEMORISE PLACE," already stored places are listed, enabling the user to select a destination out of the list. If the user touches "NATIONAL MAP," a national map is displayed with which the user can set a destination. If the user touches "TELEPHONE NUMBER," the system prompts the user to enter a telephone number. If the user enters a telephone number, a map of the portion corresponding to the out-of-town telephone exchange of the telephone number is displayed with which the user can set a destination. If user touches "PREVIOUS STARTING POINT," the previous starting point becomes the destination.

The SET DESTINATION screen enables the user to set how to specify a destination. If the user cannot use the screen properly, the following voice guidance is output: "You can select a destination specification method" if the user performs no operation for several seconds, for example seven seconds, after the SET DESTINATION screen is displayed.

As with the normal route guidance, the voice is stored as phrases in the voice storage section 32, and the phrases are read and synthesized, thereby outputting the resultant voice through the loudspeaker 34a. Although operation guidance is output in a voice after the predetermined time has elapsed, a person familiar with the operation would be able to select the specification method immediately, thus no operation guidance is output and the user is not disturbed.

PLACE NAME INDEX

Figure 8:
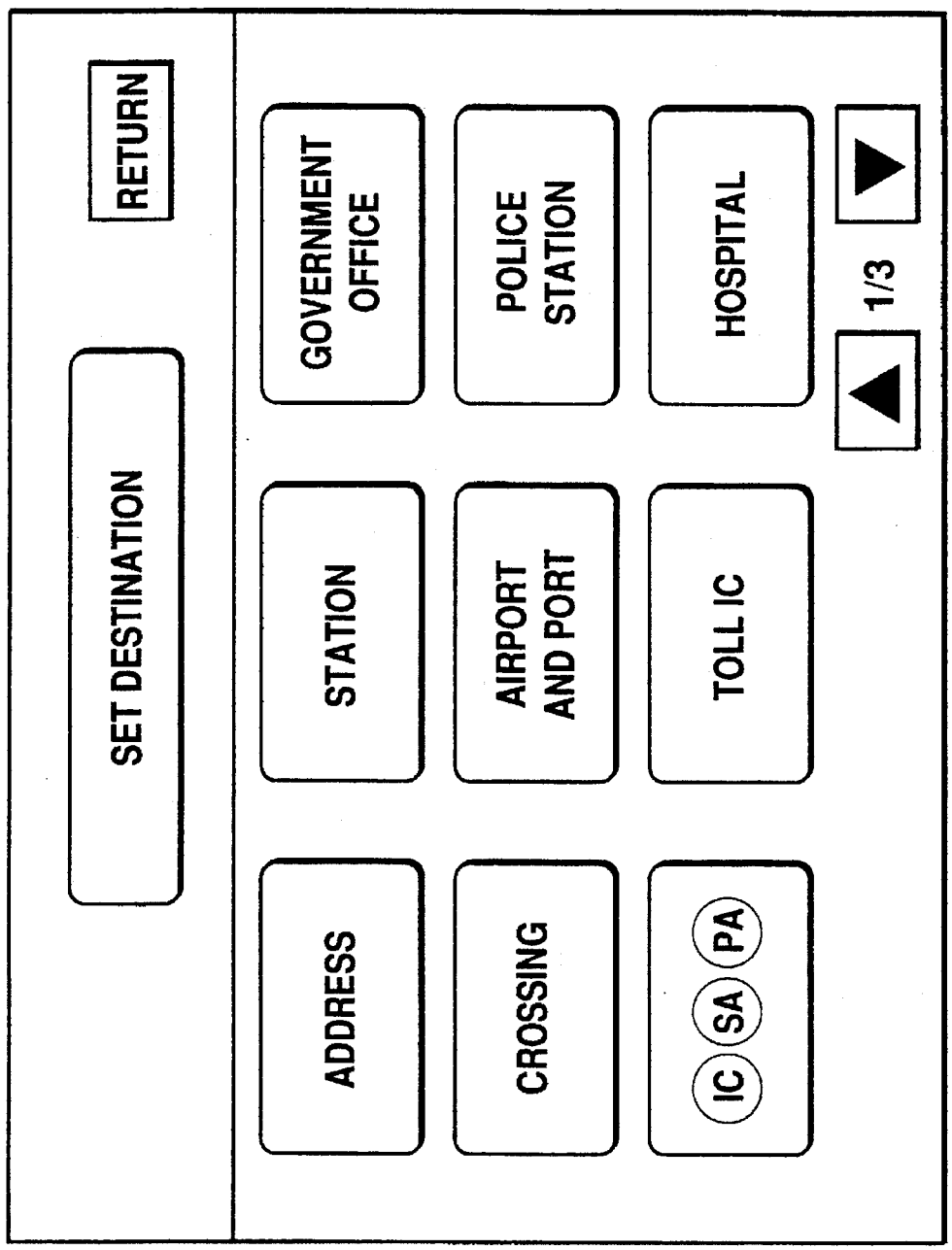
FIG. 8 is an illustration of a display of a PLACE NAME INDEX screen.

When the user touches the PLACE NAME INDEX indicator on the MENU or SET DESTINATION screen, the PLACE NAME INDEX mode is entered and the screen in FIG. 8 is displayed. If the user touches "ADDRESS" on the screen, a predetermined amount of addresses are displayed in the order of the Japanese syllabary. The user can select any desired address by scrolling the screen. If the user selects "STATION", station names are displayed among which the user can select any desired station name. If the user touches an indicator such as "GOVERNMENT OFFICE," "CROSSING," "AIRPORT AND PORT," or "POLICE STATION," the names are listed. When the user selects one of them, a map around the corresponding place is displayed with which the user can set a destination, etc.

If the user performs no operation over the predetermined time after the screen is displayed, a voice message of "you can read out a peripheral map from place name" is output.

REGISTER PLACE

Figure 9:
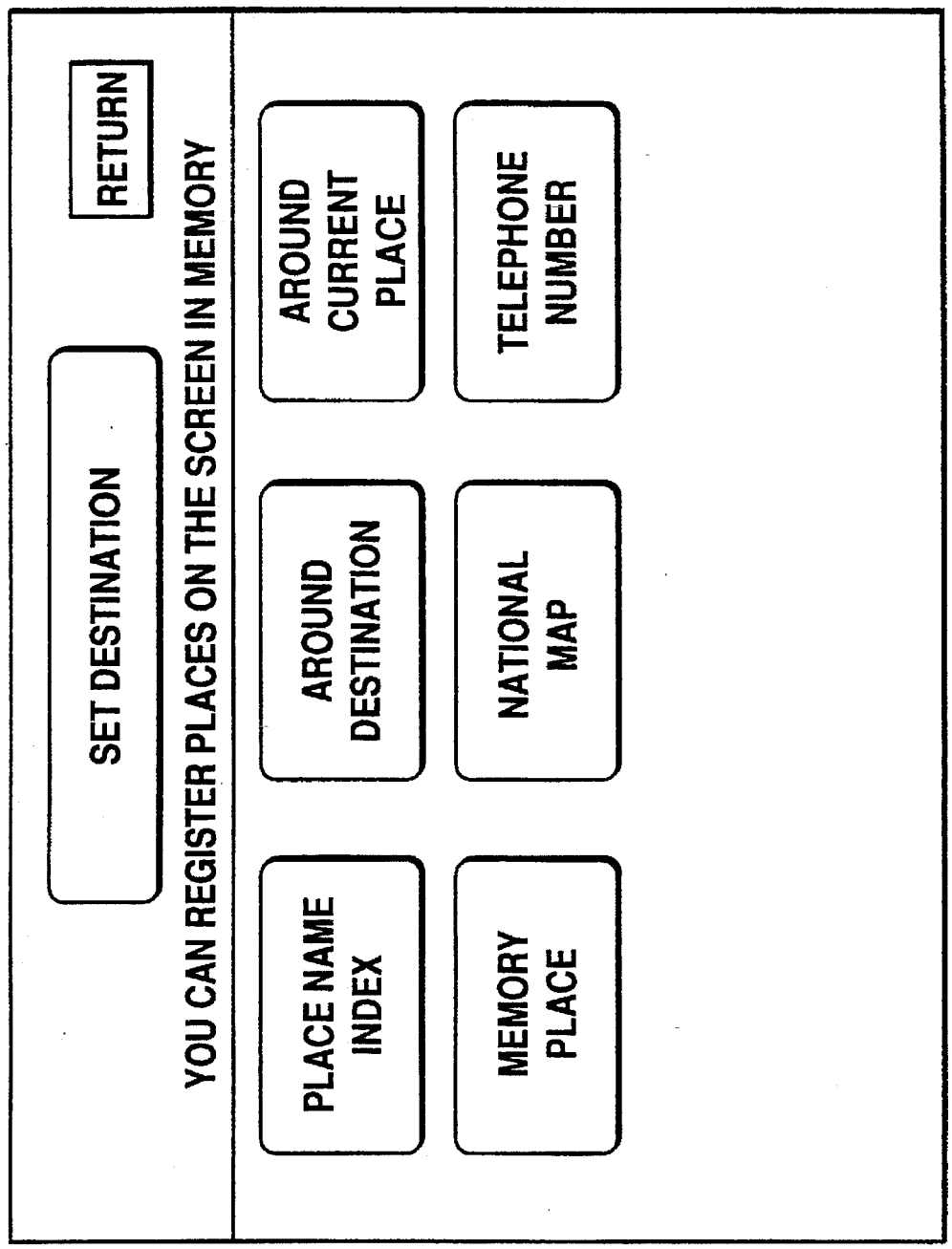
FIG. 9 is an illustration of a display of a REGISTER PLACE screen.

Desired places on a map are previously stored in memory for later use when setting destinations, etc. If the user touches the REGISTER PLACE indicator on the MENU screen, the REGISTER PLACE screen shown in FIG. 9 is displayed. The user can select an entry method by touching PLACE NAME INDEX, AROUND DESTINATION, AROUND CURRENT PLACE, MEMORISED PLACES, NATIONAL MAP, or TELEPHONE NUMBER to display a map corresponding to the specified entry for selecting any desired place.

The selected place is registered in the memory. If the user performs no operation within the predetermined time after the REGISTER PLACE screen is displayed, a voice guidance message of "you can select a place registration method" is output.

CORRECT

Figure 10:
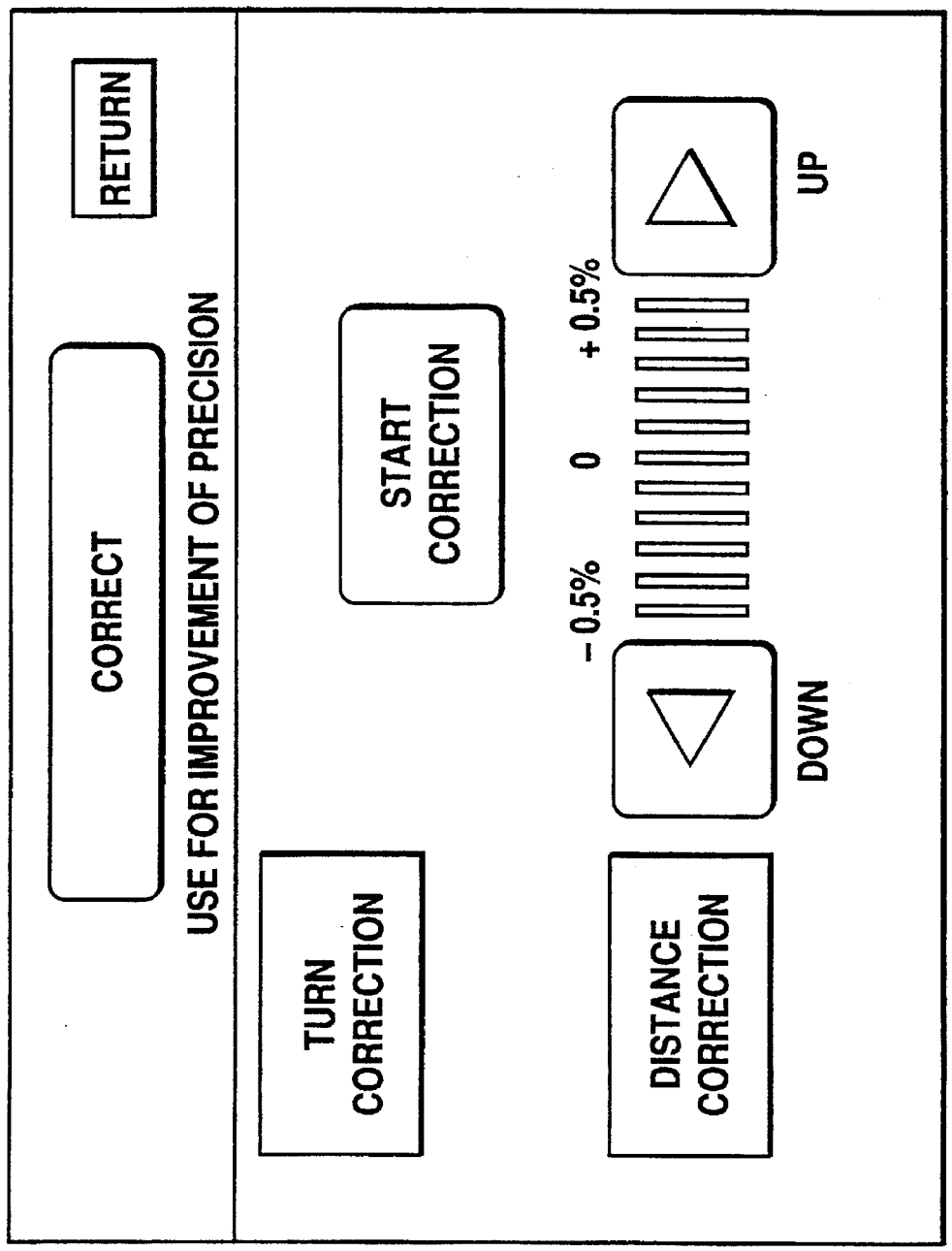
FIG. 10 is an illustration of a display of a CORRECT screen.

FIG. 10 shows a CORRECT screen to correct offsets of the terrestrial magnetism sensor and the distance sensor carried by the vehicle. When the vehicle crosses a railroad or the like, the terrestrial magnetism sensor may be magnetized and contain an offset. Since the distance sensor detects the distance from the number of wheel revolutions, etc., an error may occur in the distance sensor. A magnetization error can be detected by a turn of the vehicle and be corrected in response to it. Then, if the user touches the START CORRECTION key before starting a turn, the terrestrial magnetism sensor can be corrected. On the other hand, if the measurement value shifts from the normal value at the distance sensor carried by the vehicle, the user can touch the indicator such as DOWN or UP on the screen to correct an output of the distance sensor.

If the user performs no operation within the predetermined time on the screen, a voice message of "use when correcting the direction of movement or distance" is output.

CHANGE

Figure 11:
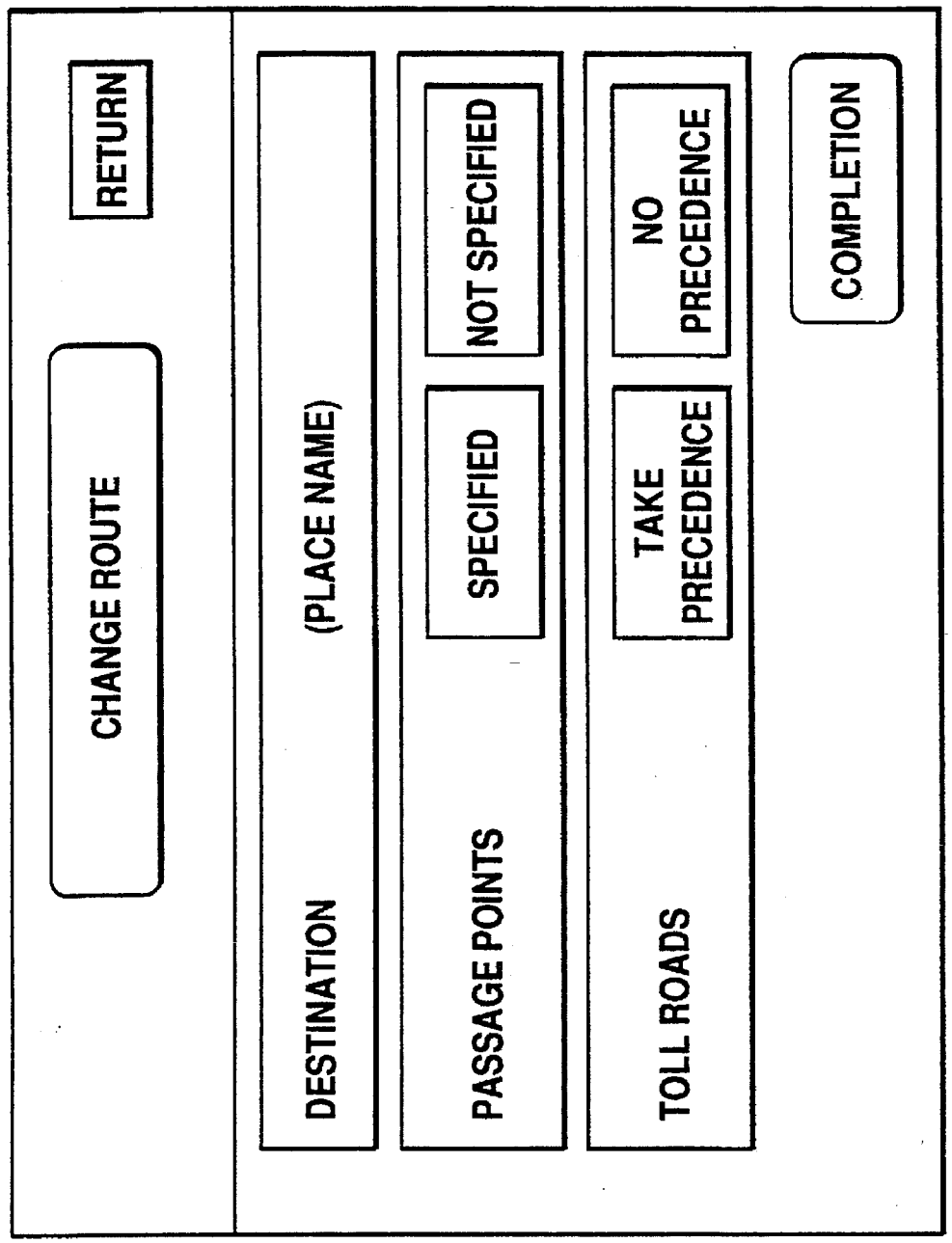
FIG. 11 is an illustration of a display of a CHANGE ROUTE screen.

FIG. 11 shows a CHANGE screen to change the route to the destination already set. The current destination is displayed on the CHANGE screen where the user can change the destination and again specify whether or not passage points are specified and whether or not toll roads take precedence over other roads. If the user makes a new specification, again a search is made for a new route and the guidance contents are changed. If the user performs no operation within the predetermined time on the screen, a voice message of "to start searching for a new route, touch COMPLETION" is output.

Thus, according to the embodiment, when waiting for the user to make an entry, the route guidance apparatus outputs an operation guidance message aurally. The voice operation guidance message is output not immediately after the entry wait state is entered, but only when the user does not respond to the display within the predetermined time, such as seven seconds. No operation guidance message is output for a person familiar with the operation and so the user is not disturbed by voice operation guidance messages. On the other hand, a voice operation guidance message is output for a person not familiar with the operation while he or she is thinking about the operation method so that the user can use the guidance message for a preferred entry.

Figure 12:
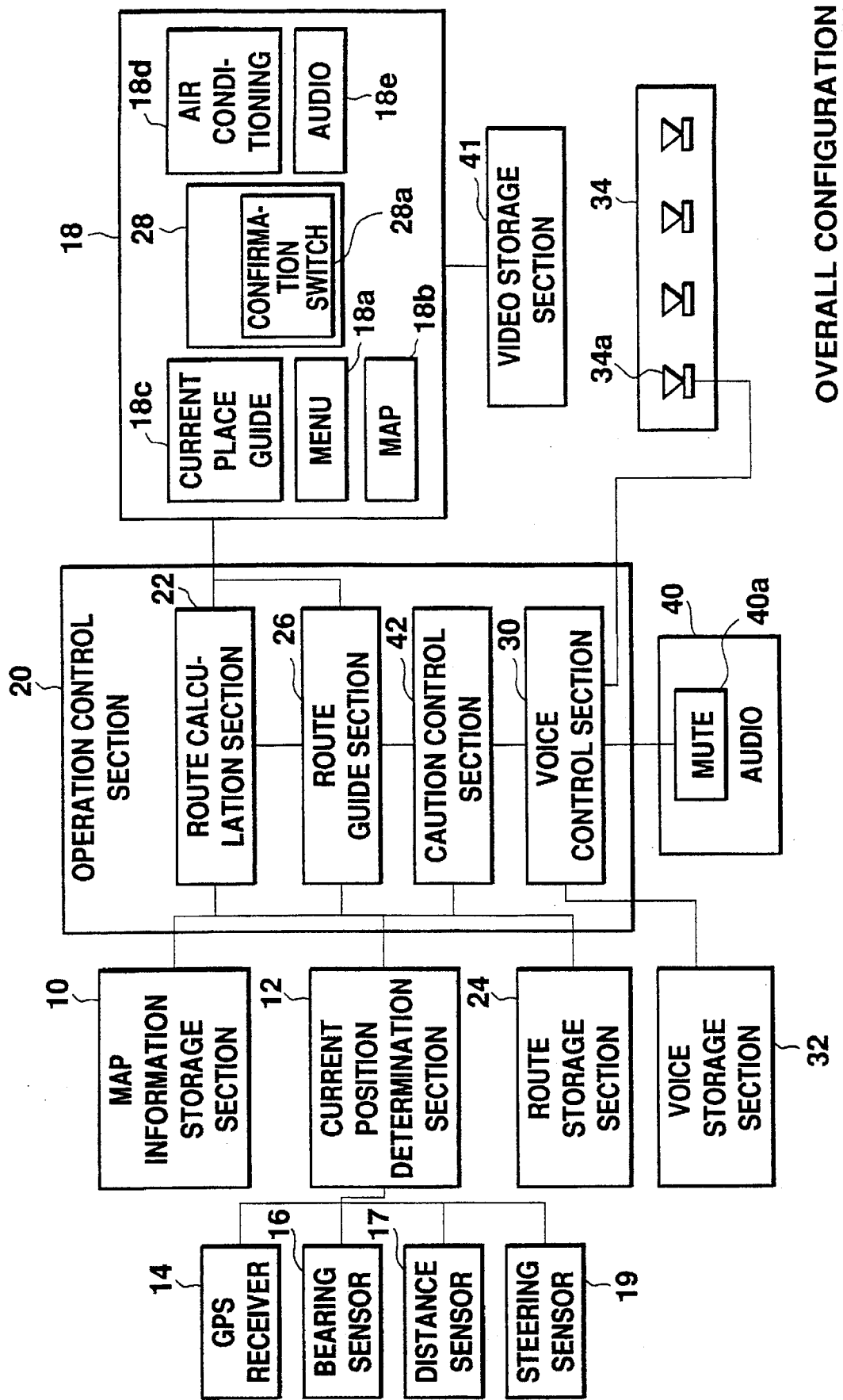
FIG. 12 is a block diagram showing the overall configuration of a route guidance apparatus according to another embodiment of the invention.
Figure 13:
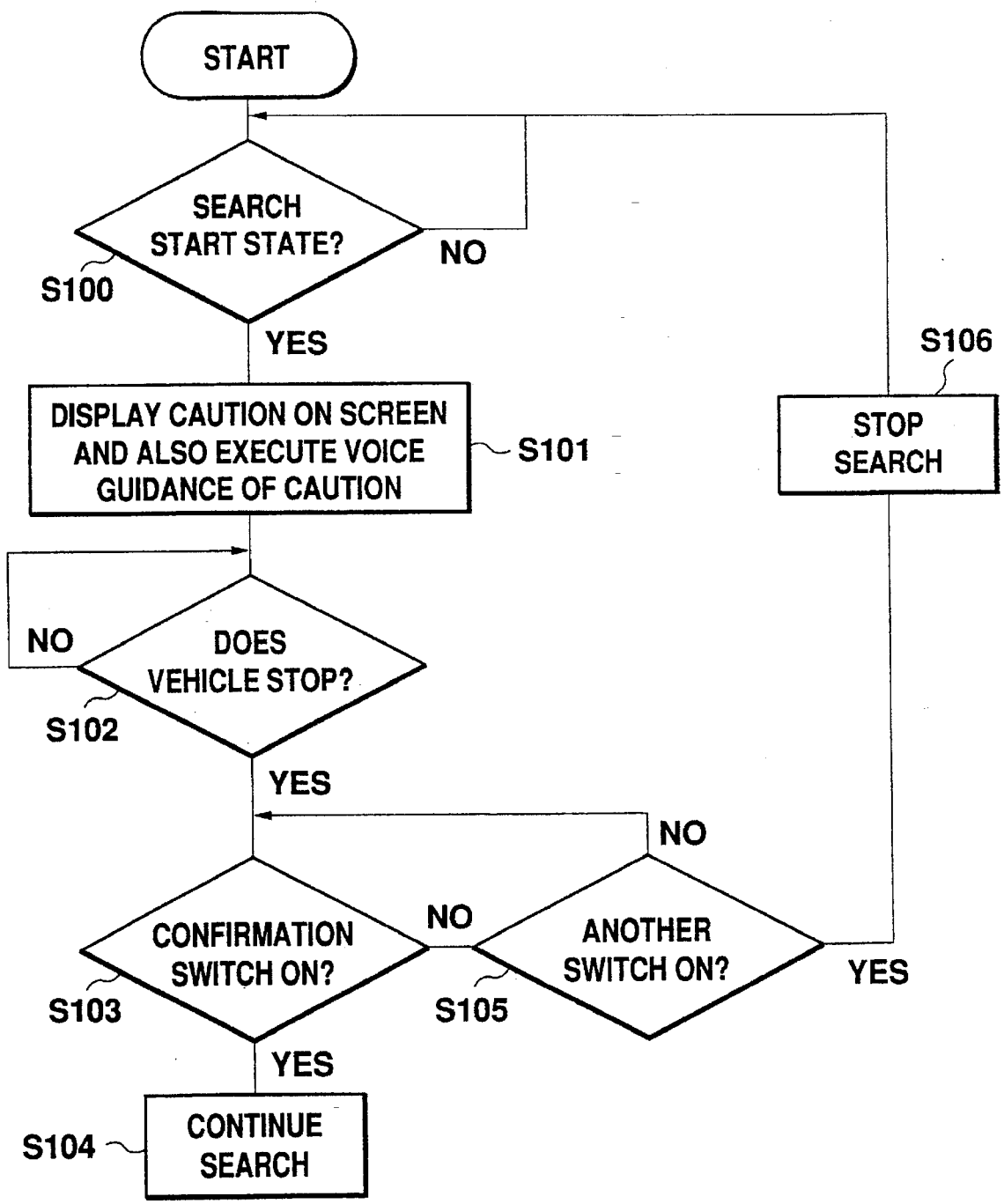
FIG. 13 is a flowchart for screen display and voice output of a caution message.

FIG. 12 shows a block diagram showing the configuration of a route guidance apparatus according to another embodiment of the invention. The embodiment contains messages for giving caution. A video storage section 41 stores video data for displaying cautions on the screen. A voice storage section 32 also stores voice data for the cautions. A distance sensor 17 is used as a vehicle speed sensor. If the wheels do not rotate and the distance does not increase, it is determined that the vehicle speed is zero, namely, the vehicle has stopped.

A caution control section 42 contained in an operation control section 20 displays a caution on a display section 28 and voice control section 30 at a predetermined stage before route guidance is executed, and indicates execution of voice guidance. The display section 28 reads the video data from the video storage section 41 and displays the data. A message is displayed such that "A route on which you can arrive at the periphery of the destination is displayed. If you drive your car on the route, you will be guided through the route with a voice and a map. Be sure to follow the actual traffic regulations." Further, a confirmation switch 28a is displayed as a panel switch in a part of the screen. After reading the caution displayed on the screen, the driver can press the confirmation switch 28a to terminate the display of the caution. The voice control section 30 also reads the voice data related to the caution from the voice storage section 32 for voice guidance. The voice guidance contents may be made like the display contents. When the distance (speed) sensor 18 senses stopping of the vehicle and the confirmation switch 28a is pressed, the caution control section 42 terminates the display of the caution and enables route guidance to be started.

The operation of the route guidance apparatus according to the embodiment, particularly for display of caution is described in conjunction with FIG. 18. Whether or not a route search can be Started is determined at step S100. After the user enters specifications such as the current position, destination, and whether or not toll roads are to be used, a route calculation section 22 executes a route search in response to the specifications. When the user enters the necessary specifications, the search start state is entered and control proceeds to step S101 at which a caution is displayed on the screen and voice guidance is also executed. Next, control proceeds to step S102 at which whether or not the vehicle stops is determined in response to a signal from the speed sensor 18. If the vehicle stops, control proceeds to step S103. The driver checks the display and voice and presses the confirmation switch 28a. Whether or not the confirmation switch 28a is pressed is determined at step S103. If the switch is pressed, control proceeds to step S104 for continuing the route search. If the confirmation switch 28a is not pressed and other switches are not pressed either at step S105, control returns to step S103. If any switch other than the confirmation switch 28a is pressed, the route search is temporarily stopped at step S106 and control returns to step S100.

Although a caution is given both on the screen and with voice guidance in the embodiment, only one of them may be used to give caution to the driver.

If the driver presses the confirmation switch within the predetermined time after caution is displayed on the screen, continuing the route search may be disabled. That is, the caution can be displayed securely for the predetermined time, thereby making sure that the caution is given to the driver.

What is claimed is:

1. A vehicle route guidance apparatus which outputs route guidance aurally through a loudspeaker which also outputs an output signal from an audio apparatus, comprising:

a voice generation section which generates a guidance voice signal for route guidance through said loudspeaker;

volume setting means being responsive to external operation, for setting a level of said guidance voice signal without changing a level of said output signal from said audio apparatus;

a circuit change switch for switching an input to said loudspeaker between said output signal from an audio apparatus and said guidance voice signal;

muting means for muting said output signal from said audio apparatus;

a control section which activates said muting means then switches said circuit change switch to said guidance voice signal when said guidance voice signal is to be output through said loudspeaker, so as to mute said output signal from said audio apparatus before said switching of said circuit change switch.

2. A route guidance apparatus as claimed in claim 1, further comprising:

external operation detection means for determining an external operation of said volume setting means; and test voice means for outputting a predetermined test voice at said guidance voice signal level when said external operation of said volume setting means is detected by said external operation detection means, whereby said guidance voice signal level can be checked after said volume setting means is externally operated.

3. A route guidance apparatus as claimed in claim 1, wherein said audio apparatus comprises a plurality of loudspeakers and said guidance voice signal is provided to only one loudspeaker.

4. A route guidance apparatus as claimed in claim 3, wherein said muting means mutes said output signal from said audio apparatus to said only one speaker which outputs said guidance voice.

5. A route guidance apparatus as claimed in claim 1, further comprising:

a display section formed with a touch panel on a surface thereof;

wherein said volume setting means comprises volume control indicators displayed on said display section and guidance voice signal level is set by a touch of said volume control indicators.

6. A route guidance apparatus as claimed in claim 5, wherein said volume control indicators comprise a guidance voice volume increase key for increasing said guidance voice signal level and a guidance voice volume decrease key for decreasing said guidance voice signal level.

7. A route guidance apparatus as claimed in claim 6, wherein said volume setting means further comprises an indicator indicating a current volume level of said guidance voice signal level.

8. A route guidance apparatus as claimed in claim 7, further comprising:

external operation time lapse detection means for detecting a lapse of a predetermined amount of time after at least one of said external operation of said volume setting means.

9. A vehicle route guidance apparatus which outputs route guidance aurally through only one of a plurality of loudspeakers which also outputs an output signal from an audio apparatus, comprising:

a voice generation section which generates a guidance voice signal for route guidance through said only one of a plurality of loudspeakers;

volume setting means being responsive to external operation, for setting a level of said guidance voice signal without changing a level of said output signal from said audio apparatus;

a circuit change switch for switching an input to said only one loudspeaker between said output signal from said audio apparatus and said guidance voice signal;

muting means for muting said output signal from said audio apparatus;

a control section which activates said muting means then switches said circuit change switch to said guidance voice signal when said guidance voice signal is to be output through said only one loudspeaker, so as to mute said output signal from said audio apparatus to said only one loudspeaker before said switching of said circuit change switch without muting said output from said audio apparatus to said plurality of speakers except said only one loudspeaker.

\* \* \* \* \*